US012755587B2

(12) United States Patent
Wolfe et al.

(10) Patent No.: US 12,755,587 B2
(45) Date of Patent: Oct. 6, 2026

(54) AIRCRAFT RECORDING SYSTEM INTERFACE FOR RAPID CONFIGURATION

(71) Applicant: Textron Aviation Inc., Wichita, KS (US)

(72) Inventors: Adam Blake Wolfe, Bentley, KS (US); Haines Todd, Derby, KS (US); Mark Christopher Hansen, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 66 days.

(21) Appl. No.: 18/887,464

(22) Filed: Sep. 17, 2024

(65) Prior Publication Data

US 2025/0104492 A1 Mar. 27, 2025

Related U.S. Application Data

(60) Provisional application No. 63/585,496, filed on Sep. 26, 2023.

(51) Int. Cl.
*G07C 5/08* (2006.01)
*B64D 45/00* (2006.01)

(52) U.S. Cl.
CPC ........... *G07C 5/0841* (2013.01); *B64D 45/00* (2013.01)

(58) Field of Classification Search
CPC ...... G07C 5/0841; G07C 5/085; B64D 45/00; B64D 2045/0065; G06F 9/4401; G06F 8/61
See application file for complete search history.

(56) References Cited

U.S. PATENT DOCUMENTS

| | | | | |
|---|---|---|---|---|
| 5,270,931 | A * | 12/1993 | Appleford | G05B 19/0426 365/228 |
| 8,121,818 | B2 | 2/2012 | Gorinevsky | |
| 8,688,313 | B2 | 4/2014 | Margol et al. | |
| 9,922,282 | B2 | 3/2018 | Weller et al. | |
| 10,742,421 | B1 | 8/2020 | Wentz et al. | |
| 11,198,446 | B2 | 12/2021 | Garcia et al. | |
| 2010/0185362 | A1 * | 7/2010 | Vialatte | G06F 30/15 707/825 |
| 2013/0198737 | A1 * | 8/2013 | Ricci | B60R 25/01 717/174 |
| 2015/0205615 | A1 * | 7/2015 | Cunningham | G06F 9/44505 713/1 |
| 2016/0171790 | A1 * | 6/2016 | Abraham | B63G 8/40 342/53 |

(Continued)

*Primary Examiner* — Ryan W Sherwin
(74) *Attorney, Agent, or Firm* — Avek IP, LLC

(57) ABSTRACT

Aircraft recording system configuration devices and methods are disclosed. The systems and methods provide a context-sensitive interface for rapid configuration. An aircraft recording system is operatively coupled to a data collection interface that is powered off and in an unconfigured state upon an initial installation of the aircraft recording system configuration device onboard an aircraft. A physical interface is disposed on an outer surface of the aircraft recording system configuration device, such that activating the physical interface causes an initial configuration of the aircraft recording system to be established. An indicator is further provided that disposed on the outer surface of the aircraft recording system configuration device, wherein the indicator is configured to indicate different states of the aircraft recording system.

20 Claims, 6 Drawing Sheets

(56) References Cited

U.S. PATENT DOCUMENTS

| | | | | |
|---|---|---|---|---|
| 2016/0176538 | A1* | 6/2016 | Bekanich | G08G 5/21 701/14 |
| 2016/0253183 | A1* | 9/2016 | Swidowski | G06F 9/4401 713/2 |
| 2020/0100198 | A1* | 3/2020 | Kashef | H04R 27/00 |
| 2021/0311713 | A1* | 10/2021 | De Meulder | B64F 5/60 |
| 2021/0325948 | A1* | 10/2021 | Lee | G06F 3/0644 |
| 2022/0130184 | A1* | 4/2022 | Pucciarella | H04W 4/80 |
| 2023/0303266 | A1* | 9/2023 | Lao | B64D 45/00 |

* cited by examiner

500

| DURATION (SECONDS) | ACTION TAKEN |
| --- | --- |
| 5 | BEGIN NEW DATA SET |
| 10 | BOOTS WIRELESS INTERFACE |
| 15 | CLEAR ALL WIRELESS CONFIGURATION OPTIONS |
| 20 | CLEAR ALL INTERNAL APPLICATION CONFIGURATION OPTIONS |

FIG. 5

600

| POWER LED | FAULT LED | SYSTEM STATUS |
|---|---|---|
| ON - SOLID | OFF | POWER IS ON, NO FAULT DETECTED |
| FLASHING | OFF | POWER IS ON, DATA IS BEING RECORDED |
| FLASHING | FLASHING | FAULT CONDITION WHICH DOES NOT PREVENT THE RECORDING OF DATA HAS BEEN DETECTED |
| ON - SOLID | ON - SOLID | FAULT CONDITION WHICH PREVENTS THE RECORDING OF DATA HAS BEEN DETECTED |
| OFF | OFF | POWER IS OFF |
| FLASHING RAPIDLY | OFF | DATA IS BEING WRITTEN TO USB<br>NOTE: DO NOT REMOVE USB DEVICE WHILE RAPID FLASH IS ACTIVE |

*FIG. 6*

AIRCRAFT RECORDING SYSTEM INTERFACE FOR RAPID CONFIGURATION

CROSS-REFERENCE TO RELATED APPLICATIONS

This application claims the benefit of U.S. Provisional Patent Application No. 63/585,496, filed Sep. 26, 2023, the entire contents thereof are herein incorporated by reference.

BACKGROUND

1. Field

Embodiments of the invention relate generally to context-sensitive interfaces for rapid configuration, and more specifically to methods and systems for configuring an aircraft recording system, thereby eliminating a requirement to physically connect peripheral devices to the aircraft recording system for performing various tasks.

2. RELATED ART

Different configurations for operating controllers are known. For example, U.S. Pat. No. 8,121,818 to Gorinevsky describes software-based methods for estimating the fault state of a device. U.S. Pat. No. 8,688,313 to Margol et al. describes a system for remotely programming a vehicle. U.S. Pat. No. 9,922,282 to Weller et al. describes a system for remotely configuring unmanned aircraft. U.S. Pat. No. 10,742,421 to Wentz et al. describes a system for verifying hardware security and running configuration programs. U.S. Pat. No. 11,198,446 to Garcia et al. describes a system for accessing content for a vehicle and running configuration programs.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

An aircraft recording system configuration device having a context-sensitive interface for rapid configuration is provided, the aircraft recording system configuration device comprising: an aircraft recording system interface operatively coupled to an aircraft recording system by way of a data collection interface, wherein upon initial installation of the aircraft recording system configuration device onboard an aircraft, the aircraft recording system is powered off and in an initial state, a physical interface disposed on an outer surface of the aircraft recording system configuration device, wherein activating the physical interface causes an initial configuration of the aircraft recording system to be established, and an indicator associated with the aircraft recording system configuration device, wherein the indicator is configured to indicate different states of the aircraft recording system.

A configuration method is provided for configuring an aircraft recording system using an aircraft recording system configuration device, the configuration method comprising: providing the aircraft recording system configuration device, wherein the aircraft recording system configuration device is unpowered and in an initial state of configuration, powering the aircraft recording system configuration device by activating a physical interface disposed on an outer surface of the aircraft recording system configuration device, wherein the physical interface comprises an indicator, automatically configuring the aircraft recording system into a default configuration state using the aircraft recording system configuration device, and recording aircraft data via the aircraft recording system by way of a data collection interface.

A configuration method is provided for configuring an aircraft recording system, the configuration method comprising: providing an aircraft recording system configuration device, wherein the aircraft recording system configuration device is unpowered and in an initial state of configuration, powering the aircraft recording system configuration device by activating a physical interface disposed on an outer surface of the aircraft recording system configuration device, booting a wireless interface, wirelessly connecting to an external device, uploading a configuration file to the aircraft recording system configuration device from the external device, establishing a configuration state via the configuration file, and recording aircraft data via the aircraft recording system.

BRIEF DESCRIPTION OF THE DRAWING FIGURES

Embodiments of the invention are described in detail below with reference to the attached drawing figures, wherein:

FIG. 5 is a table listing exemplary actions taken by the ARS devices of FIG. 1 and FIG. 2 when a physical interface is pressed for different durations; and FIG. 6 is a table listing exemplary indicator states and a corresponding status of the ARS device of FIG. 2.

Figure 1:
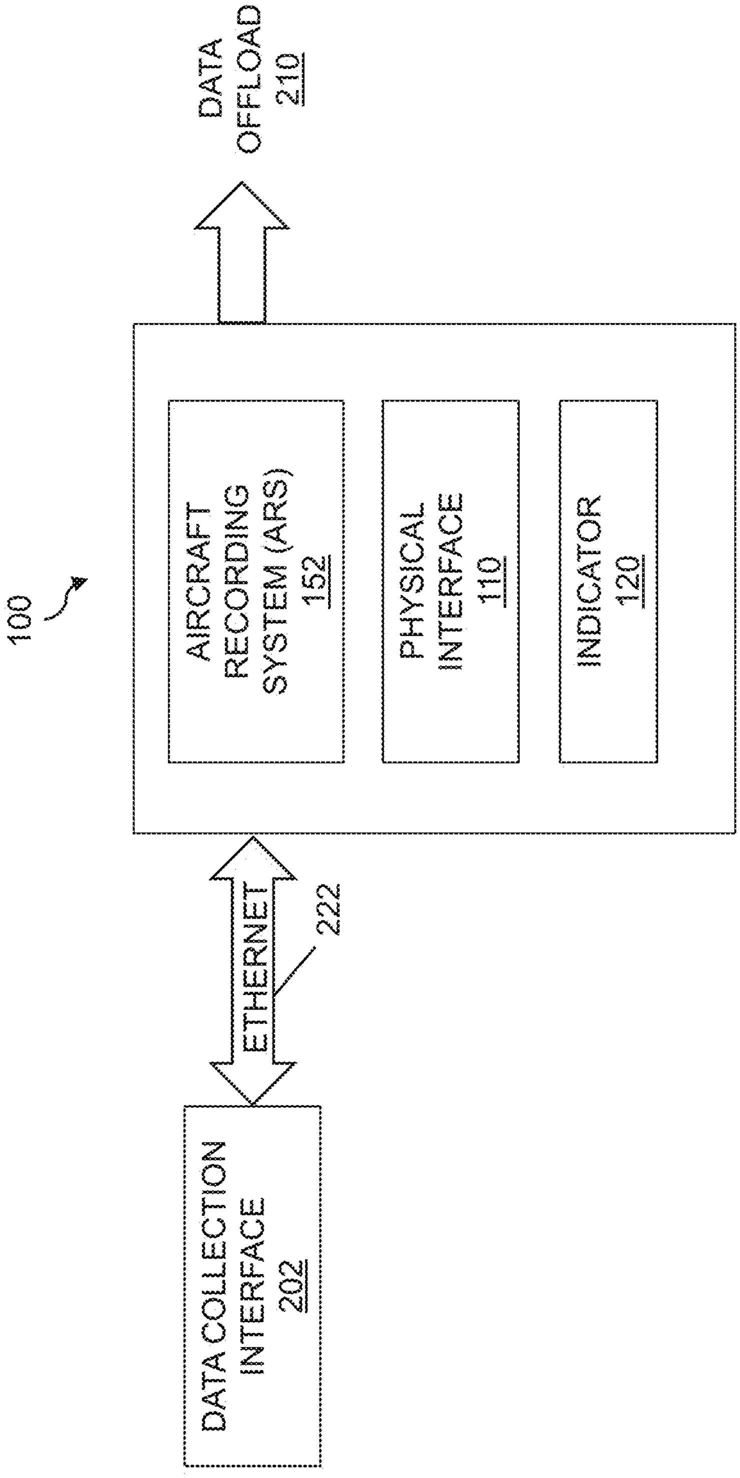
FIG. 1 is a block diagram illustrating an aircraft recording system (ARS) device configured with a context-sensitive interface for rapid configuration, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Aircraft recording system (ARS) devices consistent with the present teachings provide data acquisition and recording mechanisms designed to be installed in one or more aircraft. ARS devices may receive and record data from numerous data buses onboard an aircraft for post-flight retrieval and analysis. Stored data may be retrieved from the device via a variety of means.

ARS devices may be manufactured in an unconfigured state, which enables each ARS device to be installed in different types of aircraft. Upon installation of each ARS device in a particular aircraft, the ARS device needs to be configured upon initial booting.

Prior art data recording systems require physically connecting a laptop with a cable to configure the ARS. Alternatively, power cycling the ARS could be performed to create a new 'dataset' which was often done during flight testing or by customer service. Or, the ARS could constantly broadcast a default wireless network, but this would produce security risks.

FIG. 1 is a block diagram illustrating an aircraft recording system (ARS) device 100 configured with a context-sensitive interface for rapid configuration. The ARS device 100 relates to a data acquisition and recording system designed to be installed in aircraft such as commercial and/or general aviation aircraft. Frequently, such an ARS device 100 would be intended to be permanently installed in an aircraft. In some circumstances, multiple ARS devices 100 may be installed in an aircraft. ARS device 100 comprises an aircraft recording system (ARS) 152, a physical interface 110, and an indicator 120, which are described below.

The ARS 152 is configured to receive and record data for retrieval and analysis, such as post-flight retrieval and analysis. The ARS 152 is configured to receive many types of avionics and diagnostics data from multiple sources. For example, ARS 152 may receive and record data from ARINC 429, ARINC 717, controller area network (CAN), and other data buses (e.g., using proprietary protocols).

As shown in the FIG. 1 embodiment, ARS 152 may receive data from a data collection interface 202 via ethernet connectivity pathway 222. The ethernet connectivity pathway 222 enables data to be multiplexed from data collection interface 202 without data loss. The data collection interface 202 may comprise one or more data buses that provide data collection and optionally data concentration (e.g., via multiplexing). An aircraft may be equipped with multiple data collection interfaces 202 dispersed in remote locations throughout the aircraft (i.e. remotely located from the cockpit or another centralized computing station within the aircraft), which provides shorter wire paths from many input sources (e.g., sensors) leading to an overall reduction in wire weight.

Stored data may be retrieved from ARS 152 via a data offload pathway 210. Data offload pathway 210 may include but is not limited to a removable mass storage module, a wireless interface (e.g., 802.11 WiFi, LTE or GSM cellular connection, wirelessly through the Iridium satellite constellation), or a wired transport mechanism such as universal serial bus (USB), local area network (LAN), ethernet, etc.

ARS device 100 consistent with the present teachings may be advantageously used by various types of users. Customer service technicians may use the recorded data to troubleshoot notifications from the field regarding aircraft functionality. Flight data may be analyzed or archived during aircraft manufacture or pre-delivery. Manufacturing personnel may use the system to run functional tests, and engineers may use the data in investigating system anomalies. ARS 152 may be capable of receiving and/or transmitting data on multiple types of avionics data buses, such as: ARINC 429, ARINC 717, CAN, and other data buses. Consistent with the present teachings, data of different types may be recorded in a scalable manner and with full native rate sampling and full instrumentation.

The physical interface 110 is for example a physical button or switch disposed on an outer surface of the ARS device 100. For example, the ARS device 100 may be comprise a box with the physical interface 110 being a push button located on a façade of the box. In embodiments, physical interface 110 is a software-configurable push button. Physical interface 110 enables a user to perform an initial configuration of the ARS device 100 without needing a peripheral device to connect to the ARS device 100 for providing a user interface. The physical interface 110 may be configured to perform additional tasks beyond an initial configuration as further described below. The physical interface 110 is configured to be context sensitive because pressing and releasing the physical interface 110 is configured to perform different actions depending on the context: when the ARS device 100 is unconfigured, pressing and releasing the physical interface 110 initializes the configuration process described below; however, once the ARS device 100 is configured, pressing and releasing the physical interface 110 causes a different action to be performed such as starting a new data set, resetting to the factory default configuration, resetting passwords, switching modes, etc.

The indicator 120 is for example one or more lamps or lights disposed on an outer surface (e.g., a façade) of the ARS device 100. In embodiments, each of the one or more lights comprise a light-emitting diode (LED). In some alternative embodiments, the indicator 120 may be a user interface subcomponent in an aircraft-integrated user interface such as, for example, a tablet based aircraft data collection user interface. In some such embodiments, indicator 120 may itself be multiplexed to a physical lamp or indicator as well as to the aircraft-integrated user interface. In some such embodiments, the indicator may be actuated in connection with the aircraft-integrated user interface using a network protocol transmitted and received in connection with the via ethernet connectivity pathway 222. Different states of the indicator 120 may be used to indicate different states of the ARS device 100. For example, the indicator 120 may be illuminated when the ARS device 100 is powered on and the indicator 120 may be off when the ARS device 100 is powered off. The indicator 120 may flash on and off to indicate different states, and the rate of flashing on/off may be used to indicate different states. For example, a slow flashing may indicate that the power is on, and data are actively being recorded; a rapid flashing may indicate that data are being written to a connected device (e.g., a connected USB drive). Other system states of ARS device 100 may be indicated via indicator 120 without departing from the scope hereof.

Figure 2:
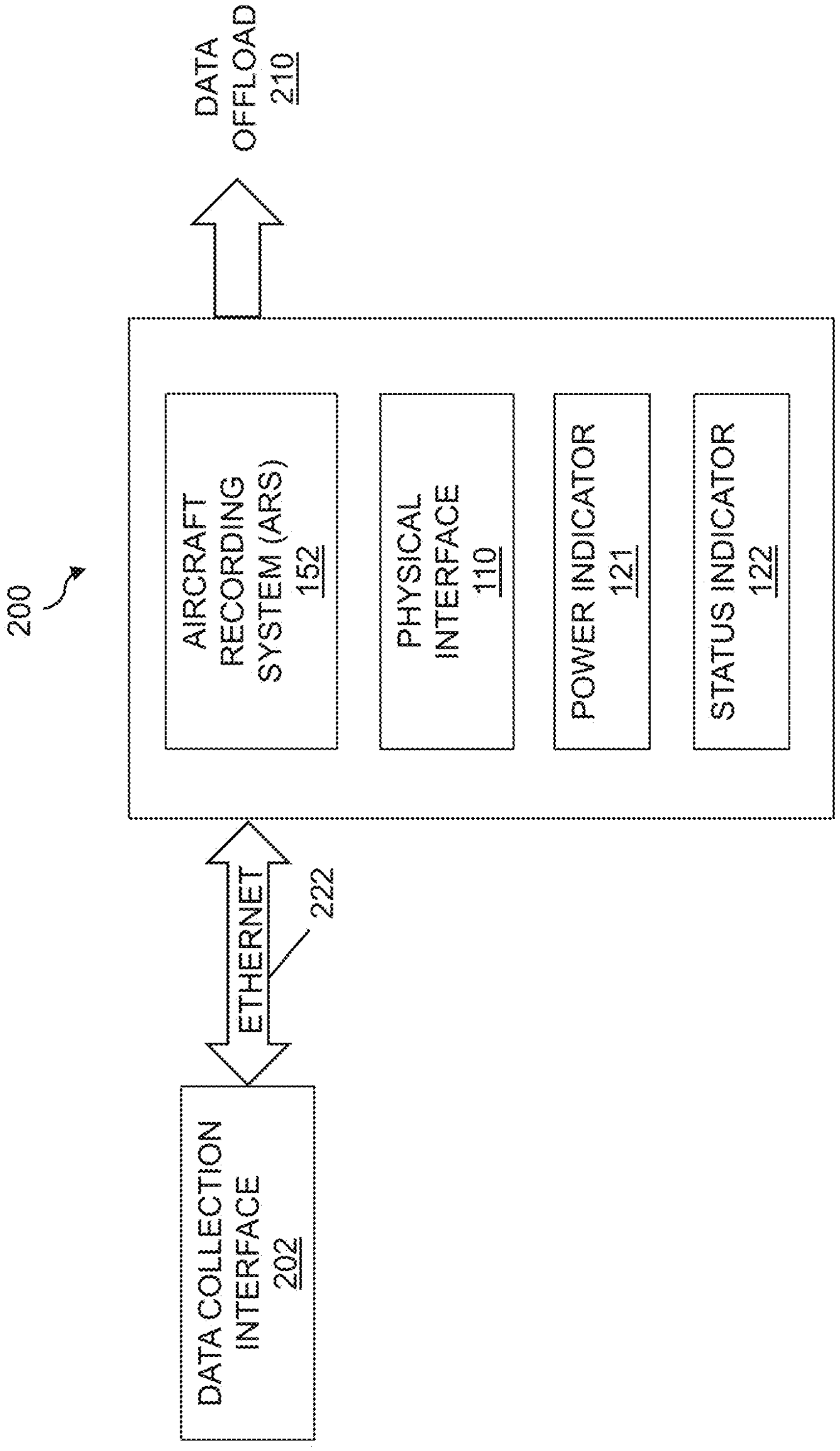
FIG. 2 is a block diagram illustrating another embodiment of an ARS device configured with a context-sensitive interface for rapid configuration.

FIG. 2 is a block diagram illustrating an aircraft recording system (ARS) device 200 configured with a context-sensitive interface for rapid configuration. ARS device 200 is an example of ARS device 100 of FIG. 1. Items enumerated with like numerals are the same or similar and their description may not be repeated accordingly. ARS device 200 comprises a power indicator 121 and a fault indicator 122 both disposed on an outer surface (e.g., the façade) of the ARS device 200. Power indicator 121 and fault indicator 122 comprise separate and independent lights (e.g., LEDs). In embodiments, the power indicator 121 is illuminated when the ARS device 200 is powered on. As noted above, in alternative embodiments, indicators such as power indicator 121 and fault indicator 122 may be provided in connection with a user interface subcomponent in an aircraft-integrated user interface such as, for example, a tablet based aircraft data collection user interface.

Figure 3:
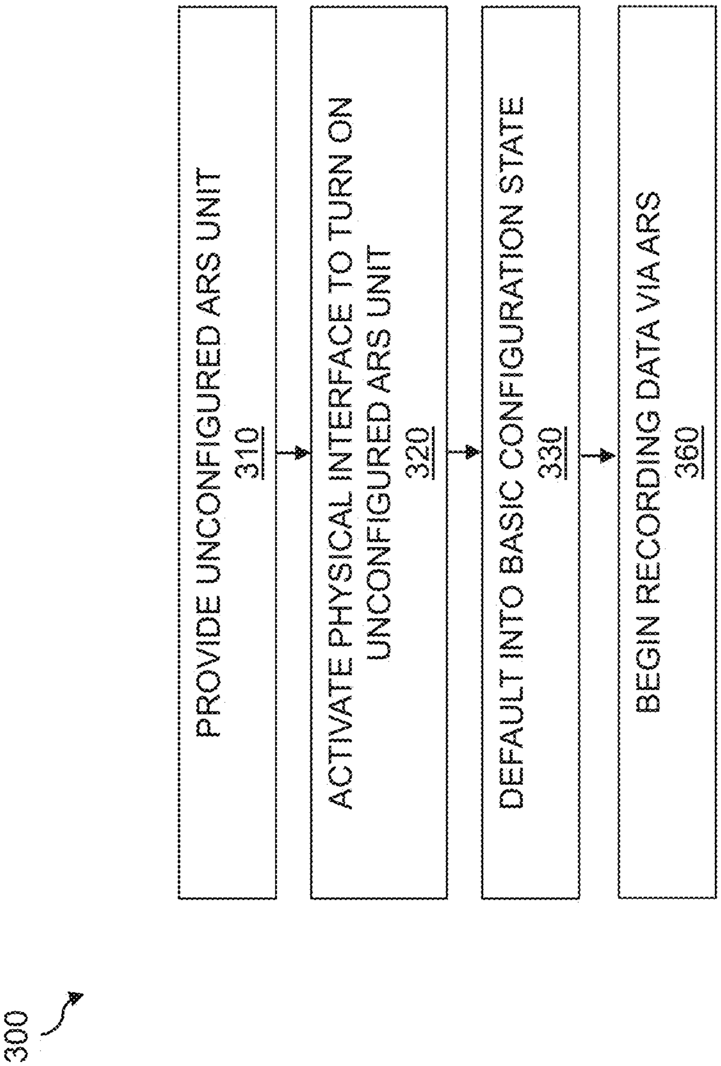
FIG. 3 is a flow diagram of an initial configuration method for configuring the ARS devices of FIG. 1 and FIG. 2, in an embodiment.

FIG. 3 is a flow diagram of an initial configuration method 300 for configuring ARS device 100/200 upon initial startup. In step 310, an unconfigured ARS device is provided. For example, ARS device 100 or 200 is installed onboard an aircraft in an unconfigured state without being powered on. In some embodiments, otherwise configured ARS device(s) may be provided. In these embodiments, the ARS devices(s) are instructed to erase any existing configuration or to reset any stored pre-configured configuration to be reset to defaults, such as "factory" defaults.

In step 320, a physical interface is activated to turn on the unconfigured ARS device. For example, physical interface 110 of FIG. 1 and FIG. 2 may be pressed and released which powers on and boots up the ARS device 100/200. In alternative embodiments, physical interface may be provided as described above in connection with a user interface, such as a touch screen user interface such that interaction with ARS device 100/200 may be accomplished by interacting with physical interface 110. In some such embodiments, physical interface 110 may be used to instruct the ARS device 100/200 to reset its configuration to factory defaults prior to imparting a new configuration as set forth in connection with the present teachings.

In step 330, the ARS device 100/200 defaults into a basic configuration state. For example, upon initial power up, the ARS device 100/200 a basic configuration state is automatically initiated. The basic configuration state may then be used to begin recording aircraft data via ARS 152. In some embodiments, defaulting to a basic configuration may be accomplished by recognizing that the device has been reset to a "factory" configuration.

In step 360, the ARS begins recording aircraft data. For example, the ARS 152 begins recording aircraft data from data collection interface 202. In some embodiments, data collection interface 202 has a built-in memory for temporarily caching data so that no data are missed during the initiation of the configuration state. Once the configuration state has been established, the cached data may be transmitted to the ARS 152 for permanent storage.

Subsequently, a user may connect to the ARS device 100/200 with a separate device (e.g., a mobile device) to change the configuration state (e.g., via a configuration utility or application), but in the meantime, data are being recorded to the ARS 152. This is important to avoid missing any events that otherwise may occur prior to the configuration state being updated.

Figure 4:
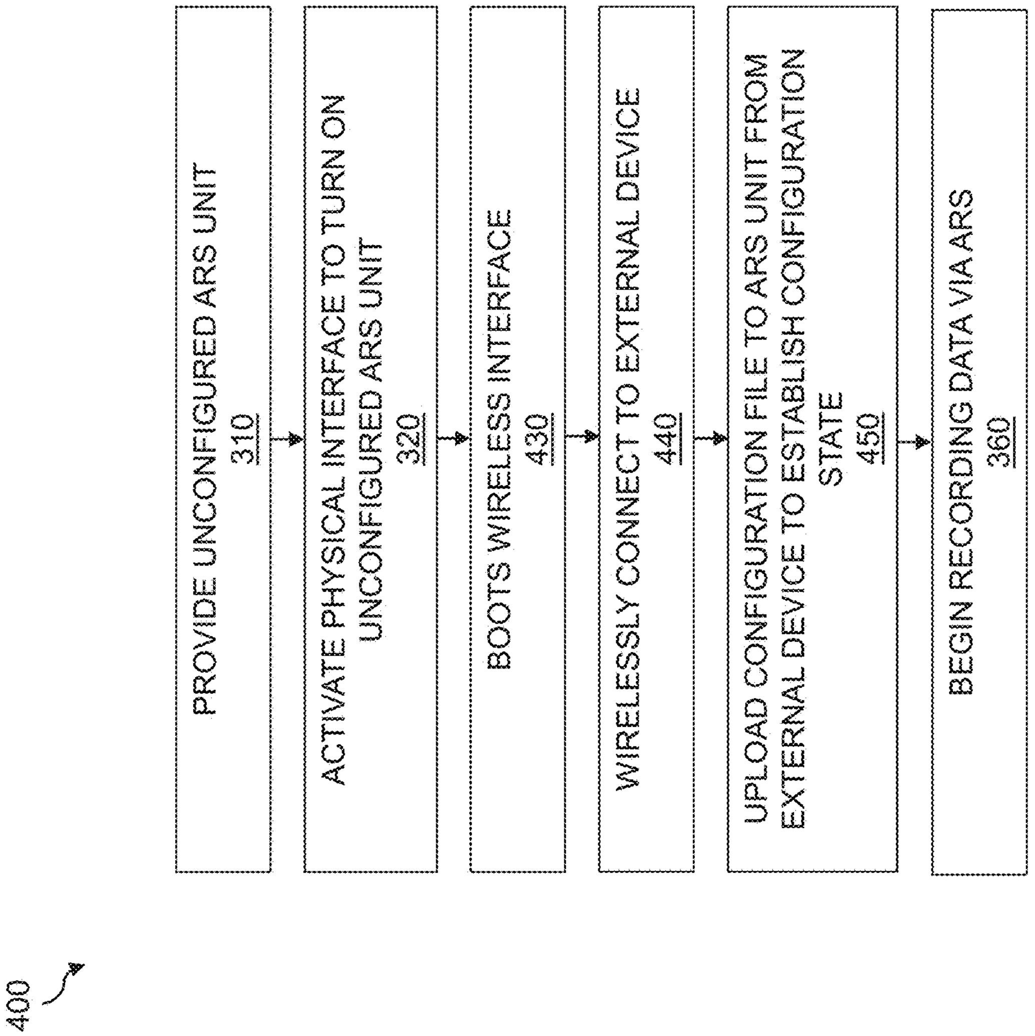
FIG. 4 is a flow diagram of another embodiment of an initial configuration method for configuring ARS devices of FIG. 1 and FIG. 2.

FIG. 4 is a flow diagram of an initial configuration method 400 for configuring ARS device 100/200 upon initial startup. Step 310 to provide an unconfigured ARS device and step 320 to press and release the unconfigured ARS device may be implemented analogously to method 300 described above in connection with FIG. 3.

In step 430, the ARS device boots in connection with its wireless interface. For example, the ARS device 100/200 boots its wireless interface into a wireless broadcasting mode. The ARS device 100/200 may remain in a standby state while waiting for an initial configuration to be initiated via an external device. The external device may be a mobile device with wireless connectivity, such as a smartphone, with an application or utility configured to upload an aircraft specific configuration to the ARS device 100/200.

In step 440, the ARS device wirelessly connects to an external device. For example, ARS 152 wirelessly connects to a mobile device via 802.11 WiFi. In some embodiments, ARS 152 takes on the role of a wireless access point broadcasting a Service Set Identifier (SSID) that is based on a serial number assigned to ARS 152. In these embodiments, an authentication parameter may be predefined in connection with an out-of-band authentication token such as a one-time-pad or other synchronized token system. In some other embodiments, ARS 152 may act as a wireless client that connects to a wireless access point having a preconfigured or other SSID that can be computed or otherwise securely determined. In some cases, a user may input authentication information into a user interface or otherwise select an authentication token from a set of possible authentication tokens.

In step 450, a configuration file is uploaded from the external device to the ARS device. For example, the ARS device 100/200 receives a configuration file from the mobile device for establishing a configuration state. The configuration state may be specific to a particular aircraft model. The initial configuration method 400 then proceeds to step 360, described above, to begin recording aircraft data to the ARS 152.

Following initial configuration of the ARS device 100/200, physical interface 110 may be used to perform other common procedures (e.g., starting a new data set, resetting to the factory default configuration, resetting passwords, switching modes, etc.). Additionally, physical interface 110 may be configured as a multifunction button (e.g., having a short press, a long press, multiple presses, etc.). In some embodiments, physical interface 110 may be provided in connection with a user-interface subcomponent as part of an overall aircraft instrumentation user interface. In these embodiments, physical interface 110 may be a button, icon, or other user interface component that may be selected by pointer, stylus, mouse pointer, etc. It is understood that a touch screen could also be incorporated such that physical interface could be interacted with by touching the touch screen to tap, touch, or otherwise select aspects of physical interface 110.

FIG. 5 shows a table of exemplary actions 500 taken by the ARS device 100/200 when physical interface 110 is pressed for different durations. For example, pressing the physical interface 110 for 5 seconds starts a new dataset; for 10 seconds, turns on the WiFi application programming interface (API) in generic state if the ARS device 100/200 is unconfigured; for 15 seconds, clears all wireless configuration options; and for 20 seconds, clears all internal application configuration options. Other durations and functions may be programmed without departing from the scope hereof.

The ARS device 100/200 is configurable to operate in different states (e.g., modes). For example, the physical interface 110 is configurable to perform multiple context-sensitive functions based on the current states/modes of the ARS device 100/200.

FIG. 6 is a table of exemplary indicator states 600 with a corresponding status listed for the ARS device. Specifically, the first column on FIG. 6 lists states of power indicator 121; the second column lists states of the fault indicator 122; and the third column lists states the corresponding status of the ARS device 200. As shown in the first row, the power indicator 121 is fully illuminated (e.g., solid on) and the fault indicator 122 is off when the power is on, and no faults are detected. As shown in the second row, the power indicator 121 is flashing and the fault indicator 122 is off when the power is on, and data are being recorded. As shown in the third row, both the power and fault indicators 121, 122 are flashing when a fault condition has been detected but the fault condition does not prevent recording of data by the ARS 152. As shown in the fourth row, both the power and fault indicators 121, 122 are fully illuminated (e.g., solid on) when a fault condition has been detected and the fault condition is preventing recording of data by the ARS 152. As shown in the fifth row, both the power and fault indicators 121, 122 are off when the ARS device 200 is powered off. As shown in the sixth row, the power indicator 121 is rapidly flashing and the fault indicator 122 is off when data are being written to a USB device via the data offload pathway 210.

In certain embodiments, for example when the ARS device 100/200 is mounted in an aircraft cockpit, the indicator 120 or indicators 121/122 may turn off after an initial period following a change of state to avoid the indicator lights being on or flashing, as this may be an annoyance to the pilots. For example, when the power is on and no fault is detected (as shown in the first row of FIG. 6), the flashing power indicator 121 may stop flashing and remain off after a certain amount of time (e.g., 10 seconds). To check the system status, a user may press and release the physical interface 110 and the power indicators 121, 122 (or indicator 120 in the case of the ARS device 100) will illuminate according to the current system status. The indicators 120, 121, 122 may first strobe rapidly for a brief period (e.g., for about 250 ms) to indicate that the press of the physical interface 110 was registered. After the indicators illuminate according to the current system status for a predetermined duration (e.g., 10 seconds), the indicators 120, 121, 122 will again turn off.

Uses of the ARS device 100/200 and the initial configuration methods 300/400 include initializing a configuration of the ARS device for a specific aircraft without needing a cable to connect to the ARS device from an external device or having to remove a front panel of the ARS device. When aircraft are in service centers or in development, live data may be accessed from the ARS device 100/200 as the data are being recorded via one or more of the data offload pathways 210. For example, physical interface 110 may be configured such that once configured, a single press and release of the physical interface 110 begins a new data set and offloads the previous data set.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. An aircraft recording system configuration device having a context-sensitive interface for rapid configuration, the aircraft recording system configuration device comprising:

an aircraft recording system operatively coupled to a data collection interface, wherein the aircraft recording system is configured to receive and record data from the data collection interface, and wherein upon initial installation of the aircraft recording system configuration device onboard an aircraft, the aircraft recording system configuration device is unpowered and in an initial state;

a physical interface disposed on an outer surface of the aircraft recording system configuration device, wherein the physical interface is a context-sensitive interface configured to perform a first function when the aircraft recording system configuration device is in the initial state and a different second function when the aircraft recording system configuration device is in a configured state, and wherein activating the physical interface when the aircraft recording system configuration device is in the initial state causes the aircraft recording system to automatically default into a basic configuration state and begin recording aircraft data from the data collection interface without requiring connection to an external device; and an indicator associated with the aircraft recording system configuration device, wherein the indicator is configured to indicate different states of the aircraft recording system.

2. The aircraft recording system configuration device of claim 1, wherein the initial state is an unconfigured state.

3. The aircraft recording system configuration device of claim 1, wherein the initial state is a configured state that is operative to transition from the configured state to an unconfigured state by way of receiving an instruction to enter a reset state.

4. The aircraft recording system configuration device of claim 1, wherein the indicator comprises a power indicator and a fault indicator.

5. The aircraft recording system configuration device of claim 1, wherein the data collection interface is coupled with an ethernet connectivity pathway that enables data to be multiplexed from the data collection interface to the aircraft recording system.

6. The aircraft recording system configuration device of claim 1, wherein the indicator is disposed on the outer surface of the aircraft recording system configuration device.

7. The aircraft recording system configuration device of claim 1, wherein the physical interface is integrated into the aircraft recording system configuration device.

8. A configuration method for configuring an aircraft recording system using an aircraft recording system configuration device, the configuration method comprising:

providing the aircraft recording system configuration device, wherein the aircraft recording system configuration device is unpowered and in an initial state of configuration;

powering the aircraft recording system configuration device by activating a physical interface disposed on an outer surface of the aircraft recording system configuration device, wherein the physical interface comprises an indicator, and wherein the physical interface is a context-sensitive interface configured to perform different functions depending on a current state of the aircraft recording system configuration device;

automatically configuring the aircraft recording system into a default configuration state using the aircraft recording system configuration device without requiring connection to an external device; and recording aircraft data via the aircraft recording system by way of a data collection interface.

9. The configuration method of claim 8, wherein the initial state of configuration is an unconfigured state.

10. The configuration method of claim 8, wherein the initial state of configuration is a configured state that is operative to transition from the configured state to the default state by way of receiving an instruction to enter the default state.

11. The configuration method of claim 8, wherein the indicator comprises a power indicator and a fault indicator.

12. The configuration method of claim 8, wherein the data collection interface is coupled with an ethernet connectivity pathway that enables data to be multiplexed from the data collection interface to the aircraft recording system.

13. The configuration method of claim 8, wherein the indicator is disposed on the outer surface of the aircraft recording system configuration device.

14. The configuration method of claim 8, wherein the physical interface is integrated into the aircraft recording system configuration device.

15. A configuration method for configuring an aircraft recording system, the configuration method comprising:

providing an aircraft recording system configuration device, wherein the aircraft recording system configuration device is unpowered and in an initial state of configuration;

powering the aircraft recording system configuration device by activating a physical interface disposed on an outer surface of the aircraft recording system configuration device, wherein the physical interface is a context-sensitive interface configured to perform different functions depending on a current state of the aircraft recording system configuration device;

booting a wireless interface;

wirelessly connecting to an external device;

uploading a configuration file to the aircraft recording system configuration device from the external device;

establishing a configuration state via the configuration file; and recording aircraft data via the aircraft recording system.

16. The configuration method of claim 15, wherein the initial state of configuration is an unconfigured state.

17. The configuration method of claim 15, wherein the initial state of configuration is a configured state that is operative to transition from the configured state to a default state by way of receiving an instruction to enter the default state.

18. The configuration method of claim 15, wherein an indicator associated with the aircraft recording system comprises a power indicator and a fault indicator.

19. The configuration method of claim 18, wherein the indicator is disposed on the outer surface of the aircraft recording system configuration device.

20. The configuration method of claim 15, wherein the physical interface is integrated into the aircraft recording system configuration device.

* * * * *